United States Patent [19]
Gold

[11] Patent Number: 6,042,188
[45] Date of Patent: Mar. 28, 2000

[54] AUTO DRIVER'S SEAT BELT SUPPORT

[76] Inventor: Peter Gold, 1630-4 Ocean Ave., Bohemia, N.Y. 11716

[21] Appl. No.: 09/274,022

[22] Filed: Mar. 22, 1999

[51] Int. Cl.[7] .............................. A62B 35/00; B60R 21/00
[52] U.S. Cl. .......................... 297/464; 297/474; 297/481; 297/483; 297/475; 297/468; 248/304
[58] Field of Search ....................... 297/464, 481, 297/468, 483, 474, 475, 476; 248/304

[56] References Cited

U.S. PATENT DOCUMENTS

| | | | |
|---|---|---|---|
| 3,995,885 | 12/1976 | Plesniarski | 297/474 |
| 4,083,602 | 4/1978 | Mori et al. | 297/481 |
| 4,482,187 | 11/1984 | Nagashima et al. | 297/483 X |
| 4,529,249 | 7/1985 | Ino | 297/474 |
| 4,919,488 | 4/1990 | Deegener et al. | 297/481 X |
| 5,927,818 | 7/1999 | Di Paola | 297/474 |
| 5,944,295 | 8/1999 | McSherry | 248/304 |

*Primary Examiner*—Peter M. Cuomo
*Assistant Examiner*—Rodney B. White
*Attorney, Agent, or Firm*—Myron Amer PC

[57] ABSTRACT

The positioning of the buckle plate of an auto driver's safety belt so that it is within reach of the driver without the need to turn attention away from traffic in front of the auto, a dangerous maneuver often needed when the safety belt, through oversight, has to be buckled after the auto is in motion.

1 Claim, 4 Drawing Sheets

AUTO DRIVER'S SEAT BELT SUPPORT

The present invention relates generally to improvements for an auto driver's side safety belt, the improvements more particularly serving as a reminder to apply the safety belt as mandated by law.

The use of seat belts within automobiles is exceedingly common. At the present time, almost every automobile that is manufactured is manufactured with a seat belt for each seat of the automobile. Within a substantial number of jurisdictions, it is a law that each occupant of the automobile must be wearing a seat belt during operations of the vehicle. A common form of a seat belt assembly includes two separate belts, one being a lap belt and the other being a chest belt. In some installations these two separate belts are formed as one belt, but when installed in position across the passenger seat, a portion of the single belt is positioned across the occupant's lap and another portion of the belt extends across the occupant's chest.

It is of course necessary to have the seat belt assembly to be moved to a "out-of-the-way" position during entry into and egress from the vehicle. In order to provide this "out-of-the-way" stowage position, it has been common to have the entire seat belt assembly to move by a retraction mechanism to a position located rearwardly of the passenger seat.

This rearward position of the seat belt assembly has certain disadvantages. The primary disadvantage is that the occupant must reach behind the seat, find the seat belt assembly, and then move such to the installed position across the occupant's body. Although this installing procedure should be accomplished prior to operating of the vehicle, all too frequently it is accomplished while the vehicle is moving. There have been numerous occasions where the driver of the vehicle has momentarily taken his eyes off the road to install the seat belt assembly, and as a result has found himself involved in an accident which could have been avoided if the driver had had his eyes on the road.

Broadly, it is an object of the present invention to provide a driver's side presentation of the safety belt overcoming the foregoing and other shortcomings of the prior art.

More particularly, it is an object to present the safety belt in a display which serves as a reminder to the driver to "buckle up" and also facilitates doing so without requiring inattentiveness to traffic conditions, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
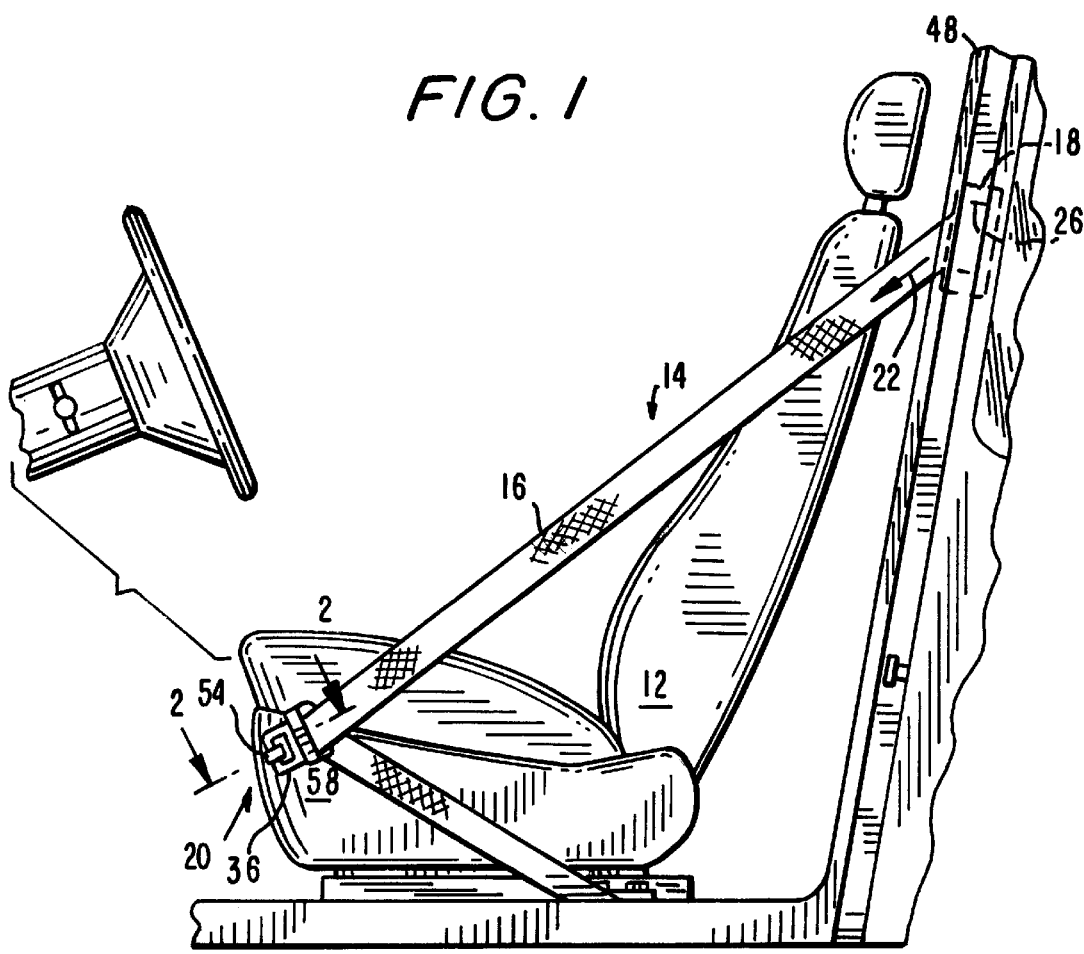
FIG. 1 is a side elevational view, partially in section, illustrating the manner in which the safety belt is displayed to a driver through the opening of a driver's side door.
Figure 2:
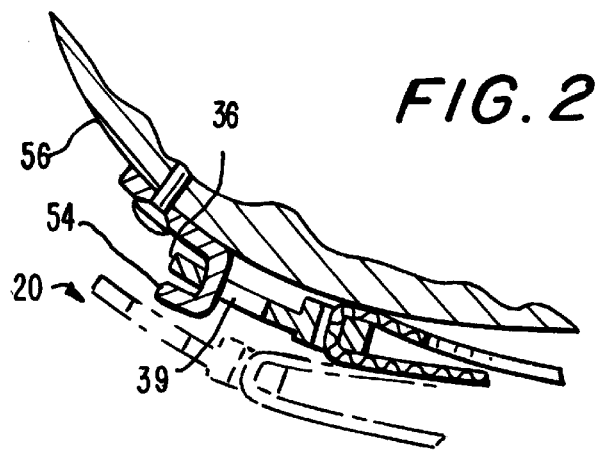
FIG. 2 is a partial view in section as taken along line 2—2 of FIG. 1 illustrating in phantom perspective the disengagement of a buckle tongue from a cooperating connector.

After a driving interlude during which it will be understood that a driver 10 has used a driver's seat 12 safety belt, generally designated 14, in the manner prescribed by law, upon exiting the driver 10 will position the safety belt 14, as shown in FIG. 1, so that upon opening the door (not shown for simplicity) a length portion 16 of the belt 14 is angularly oriented in spanning relation between a spring-operated pay out and windup reel 18 and a connection location, as at 20, the connection at the reel 18 affording the length portion 16 lengthwise movement 22 as results from pay out or counterclockwise rotation against the urgency of a helical spring 26 which urges the reel 18 in clockwise windup rotation, and wherein the connection 20 is stationary until there is manual removal thereof preparatory to the "Belting in" of the driver 10.

Figure 3:
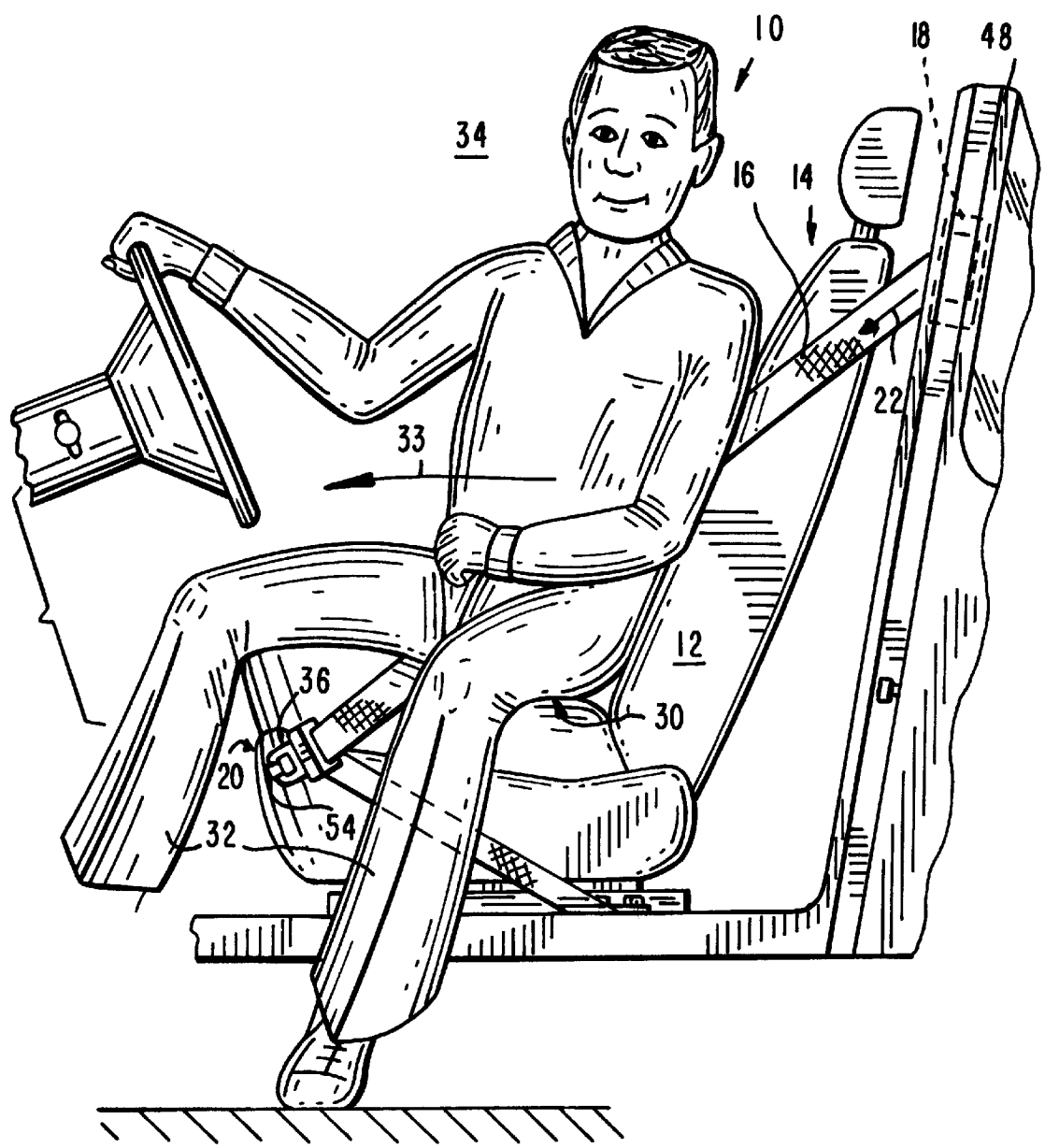
FIG. 3 is a view similar to FIG. 1, but illustrating a first step of the entry of the driver into the auto.

Next, as depicted in FIG. 3, the driver 10 assumes a sitting position, as at 30, on the length portion 16 which is permitted by the degree of movement 22, after which the driver's legs 32 are shifted in the direction 33 into the auto interior 34 into a sitting position behind the angled length portion 16.

Figure 4:
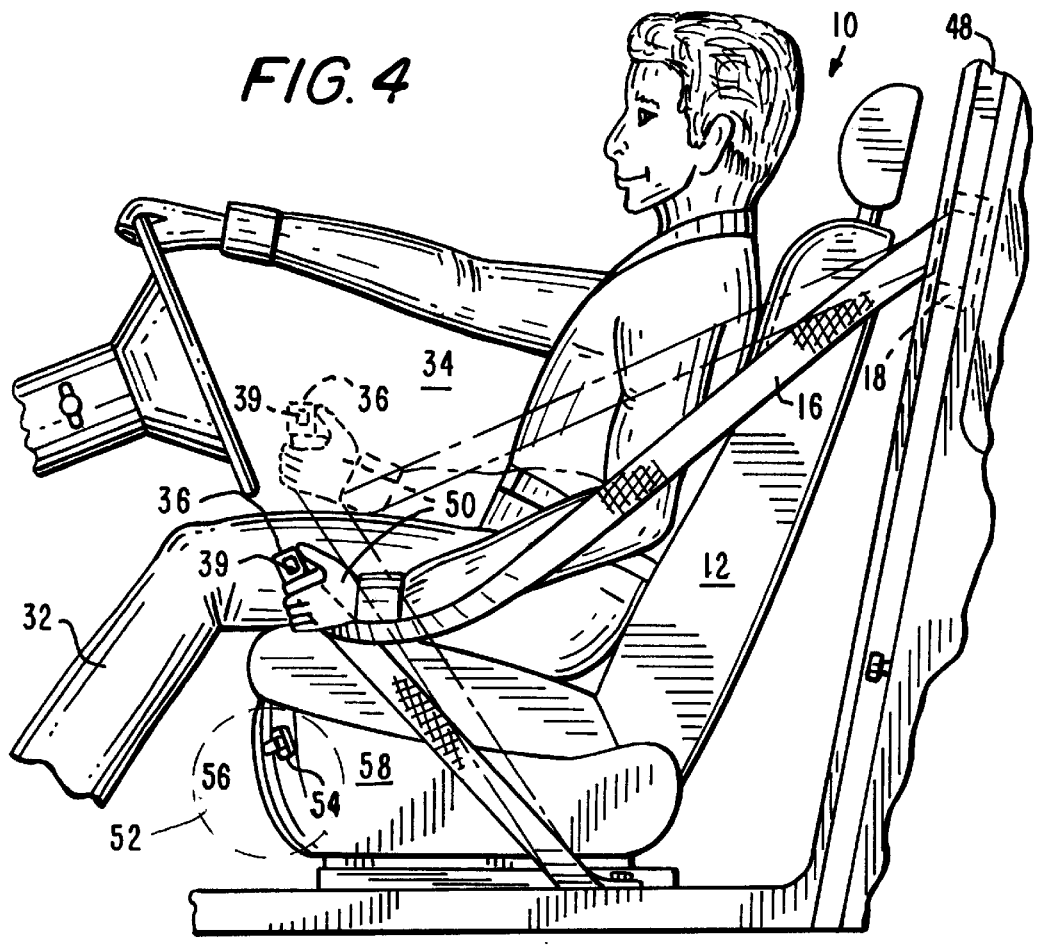
FIG. 4 is similar to FIG. 3, but illustrating a second step of the entry of the driver into the auto.
Figure 5:
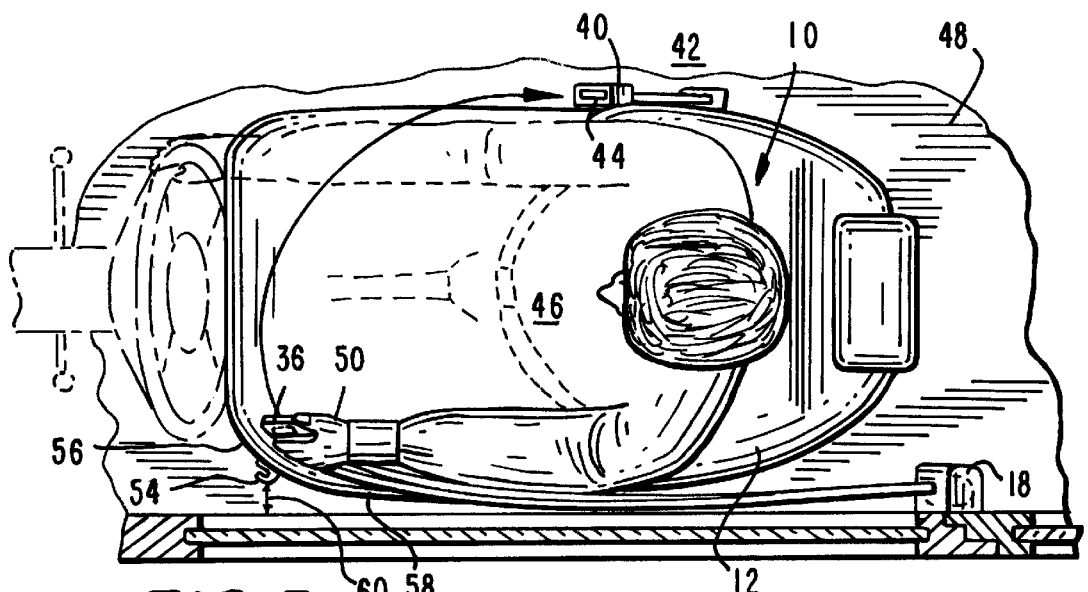
FIG. 5 is an illustration of the second entry step of FIG. 4, but as seen from a plan view perspective.
Figure 6:
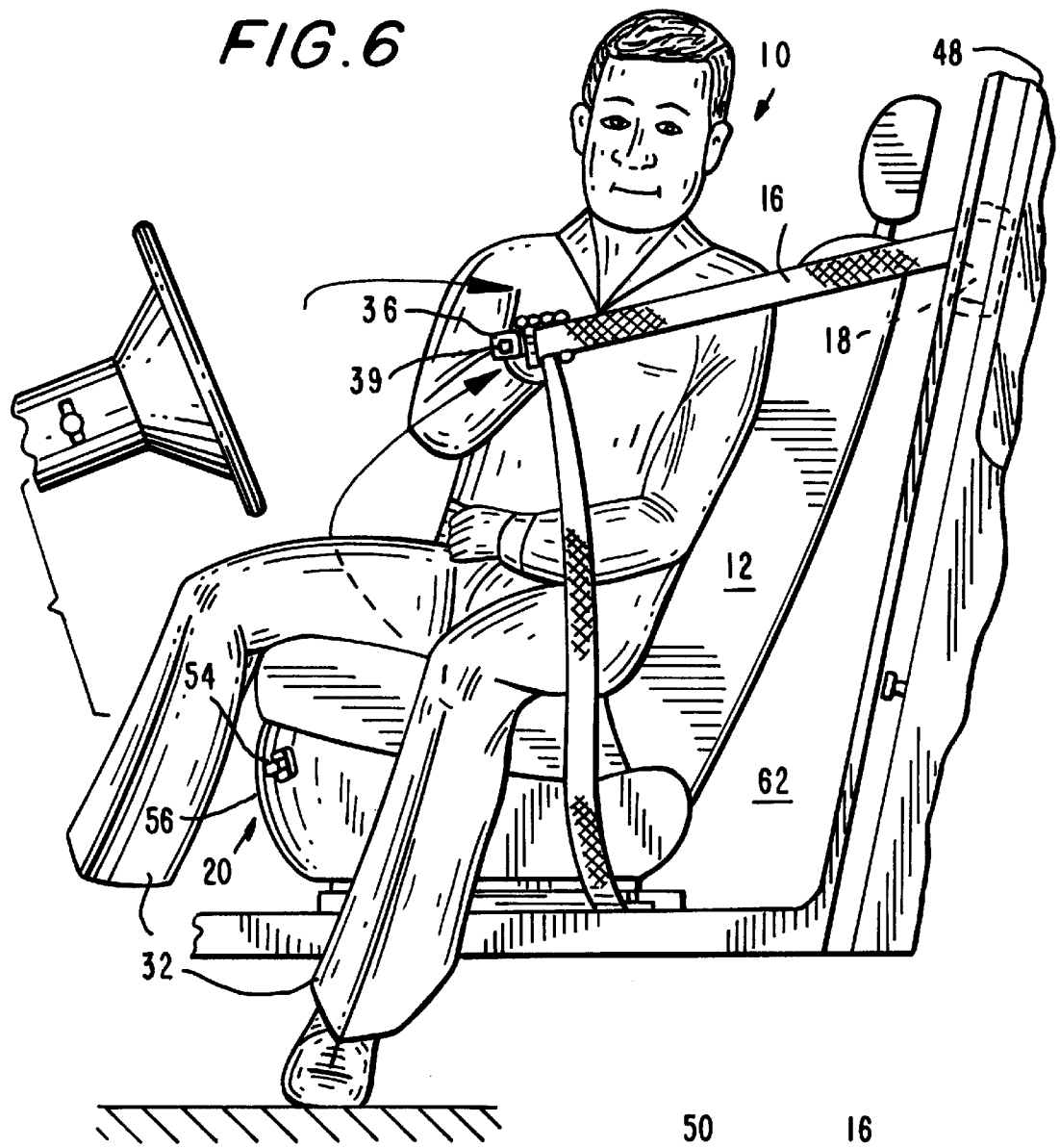
FIG. 6 is a view similar to FIG. 3, but illustrating the driver exiting from the auto.
Figure 7:
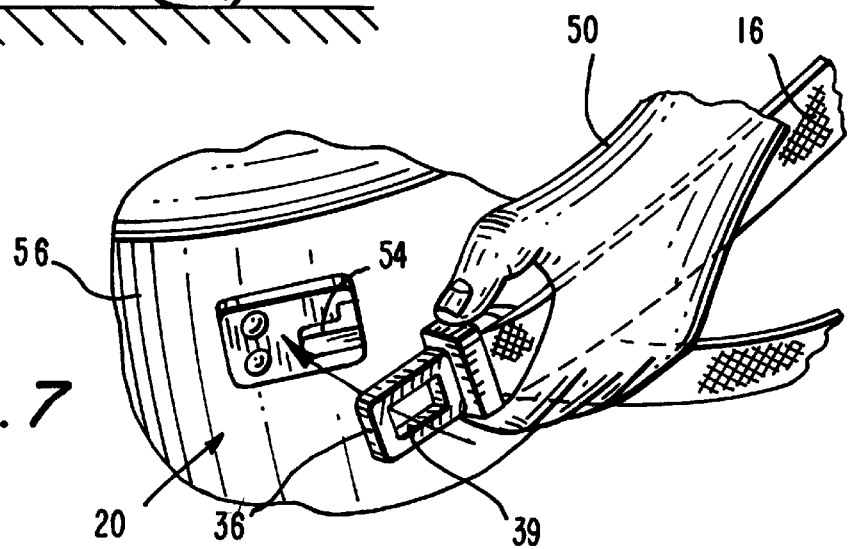
FIG. 7 is a view similar to FIG. 2, but illustrating the restored interengagement of the buckle tongue to its cooperating connector.

The connection 20, the specifics of which will be subsequently described, is manually disconnected so that the driver can readily move into alignment a buckle tongue 36 with a latching notch 39 with a buckle 40 situated between the driver's and front passenger's seats 12 and 42, so that a latch projection 44 of the buckle 40 projects into the notch 39 and latches in place the buckle tongue 36 within the buckle 40. As shown in FIGS. 4 and 5, the belt 14 is then being used as prescribed by law with the length portion 16 in encircling relation about the user's chest 46.

After a driving interlude, the driver 10 will prepare for exiting the auto 48 by manually unbuckling the length portion buckle tongue end 36 and moving it for alignment with and for connection at location 20, which location is to be understood to be within the reach of the driver's left hand 50 and generally designated 52. In a preferred embodiment the location connection 52 is established at the location of a latch projection 54 on the left-front wall 56 of the pedestal 58 of the driver's seat 12 preferable at a curvature usually embodied in wall 56 for both appearance and to obviate a 90-degree corner, it having been found in practice that the curvature affords a clearance 60 to facilitate the positioning of the latching projection 56 within the buckle plate 36. The clockwise urgency of the spring-operated reel 18 then winds up the length portion 16 so it assumes the condition in which it is presented to the driver 10 as depicted in FIG. 1.

To exit the car 48, the driver's legs 32 are shifted over the angled length portion 16 to the exterior of the door opening 62, a maneuver which is readily accomplished by pay out movement 22, to the extent necessary, of the length portion 16, followed by the take-up of any slack in the length portion 16 by clockwise rotation of the reel 18.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In combination, a front auto driver's seat and a cooperating safety belt, said front auto driver's seat comprising a horizontally oriented seat, a rectangular-shaped support attached in depending relation from said seat having opposite outboard and inboard sides, a vertically oriented backrest, attached rearwardly of said seat, an auto body having edges bounding an auto front door opening thereinto adjacent said seat, and a safety belt comprising a first length portion thereof having first and second ends, a reel mounted on an interior of said auto body adjacent an upper corner of said front door opening and adjacent said vertically oriented backrest, first end of said safety belt first length portion attached to said reel so as to be effective in facilitating a positioning thereof angularly across a chest of a driver seated in said seat, a second length portion of said safety belt having first and second ends, a belt-attachment means mounted on an interior of said auto body adjacent a lower corner of said auto front door opening and adjacent said vertically oriented backrest, a first end of said safety belt second length portion attached to said belt-attachment so as to be effective in facilitating the positioning thereof horizontally across a lap of a driver seated in said seat, a buckle tongue having a sized and shaped body and edges therein bounding a tongue-positioning opening, a buckle mounted adjacent an inboard side of said support shaped to receive in projected relation therein said buckle tongue effective to facilitate positioning thereof angularly across a chest of a driver seated in said seat, and a laterally extending buckle tongue-engagement means mounted to the outboard side of said rectangular-shaped support at a front portion of the driver's seat so as to be in a convenient reach of a left hand of a driver seated in said seat, said buckle tongue-engagement means having an optional operative position in projected relation through said tongue-positioning opening prior to a use for passage of a driver into said auto through said front auto door opening.

* * * * *